US012119582B2

(12) United States Patent
Uppleger

(10) Patent No.: US 12,119,582 B2
(45) **Date of Patent: *Oct. 15, 2024**

(54) ELECTRICAL SOCKET WITH CONTOURED CONTACT BEAMS

(71) Applicant: Amphenol Corporation, Wallingford, CT (US)

(72) Inventor: Michael E. Uppleger, Cottrellville, MI (US)

(73) Assignee: AMPHENOL CORPORATION, Wallingford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/316,626

(22) Filed: May 12, 2023

(65) Prior Publication Data

US 2023/0283001 A1 Sep. 7, 2023

Related U.S. Application Data

(63) Continuation of application No. 17/901,503, filed on Sep. 1, 2022, which is a continuation of application
(Continued)

(51) Int. Cl.

| | |
|---|---|
| ***H01R 13/11*** | (2006.01) |
| ***H01R 24/86*** | (2011.01) |
| ***H01R 43/16*** | (2006.01) |

(52) U.S. Cl.
CPC ........... *H01R 13/111* (2013.01); *H01R 24/86* (2013.01); *H01R 43/16* (2013.01)

(58) Field of Classification Search
CPC .. H01R 13/426; H01R 13/187; H01R 13/111; H01R 12/58; H01R 24/86; H01R 43/16
(Continued)

(56) References Cited

U.S. PATENT DOCUMENTS 3,192,498 A * 6/1965 Ruehlemann .......... H01R 13/35 439/223
3,406,376 A * 10/1968 Varrin .................. H01R 13/111 439/852
(Continued)

FOREIGN PATENT DOCUMENTS

CN 205565077 U 9/2016
CN 106450877 A 2/2017
(Continued)

OTHER PUBLICATIONS

Chinese First Office Action and Search Report; Chinese Application No. 2019800353644; Date: Jul. 28, 2021; 13 pages.
(Continued)

*Primary Examiner* — Marcus E Harcum
(74) *Attorney, Agent, or Firm* — CANTOR COLBURN LLP

(57) ABSTRACT

An electrical socket and method of making an electrical socket. The socket includes a body that has spaced contact beams extending between the first and second ends and an inner receiving area for accepting a mating pin. The contact beams are configured for aligning into a hyperbolic geometry. Each of the contact beams has a middle section between first and second end sections. Each middle section has a pre-formed contour that defines a cross-section of each contact beam that defines a fully radiused, inner contact area without sharp edges such that each middle section extends further into the inner receiving area than the first and second end sections when the contact beams are aligned into the hyperbolic geometry and such that the fully radiused, inner contact areas of the contact beams are positioned for contact with the mating pin when inserted into the inner receiving area of the socket body.

27 Claims, 6 Drawing Sheets

Related U.S. Application Data

No. 17/170,348, filed on Feb. 8, 2021, now Pat. No. 11,444,402, which is a continuation of application No. 16/595,938, filed on Oct. 8, 2019, now Pat. No. 10,950,964, which is a continuation of application No. 15/940,221, filed on Mar. 29, 2018, now Pat. No. 10,541,489.

(58) Field of Classification Search
USPC ........................................ 439/748, 843, 846
See application file for complete search history.

(56) References Cited

U.S. PATENT DOCUMENTS

| | | | | | |
|---|---|---|---|---|---|
| 3,697,934 | A | * | 10/1972 | Merry | H01R 13/428 439/852 |
| 3,861,776 | A | | 1/1975 | Deal | |
| 4,002,400 | A | | 1/1977 | Evans | |
| 4,128,293 | A | | 12/1978 | Paoli | |
| 4,657,335 | A | | 4/1987 | Koch et al. | |
| 4,734,063 | A | | 3/1988 | Koch et al. | |
| 4,734,064 | A | | 3/1988 | Knapp et al. | |
| 4,938,720 | A | | 7/1990 | Romak | |
| 5,374,202 | A | | 12/1994 | Anderson | |
| 5,474,479 | A | | 12/1995 | Bennett et al. | |
| 5,575,691 | A | * | 11/1996 | Matthews | H01R 13/426 439/744 |
| 5,676,571 | A | * | 10/1997 | Matthews | H01R 13/187 439/843 |
| 5,681,187 | A | | 10/1997 | Fukushima et al. | |
| 5,807,120 | A | | 9/1998 | Matthews | |
| 5,898,993 | A | * | 5/1999 | Inaba | H01R 13/17 29/874 |
| 6,062,919 | A | * | 5/2000 | Trafton | H01R 13/187 439/843 |
| 6,254,439 | B1 | | 7/2001 | Endo et al. | |
| 6,425,786 | B1 | | 7/2002 | Scholler | |
| 6,520,998 | B1 | | 2/2003 | Scholler et al. | |
| 6,656,002 | B2 | | 12/2003 | Zhao et al. | |
| 6,837,756 | B2 | | 1/2005 | Swearingen et al. | |
| 6,899,571 | B1 | | 5/2005 | Koch et al. | |
| 7,682,206 | B2 | | 3/2010 | Kainz | |
| 8,029,326 | B2 | | 10/2011 | Rossman | |
| 8,078,280 | B2 | | 12/2011 | Sage | |
| 8,142,238 | B2 | | 3/2012 | Heigl et al. | |
| 8,784,143 | B2 | | 7/2014 | Edgell et al. | |
| 8,827,755 | B2 | | 9/2014 | Blakborn | |
| 9,257,769 | B2 | | 2/2016 | Ito | |
| 10,135,180 | B2 | * | 11/2018 | Sturgess | H01R 13/622 |
| 2002/0187686 | A1 | | 12/2002 | Zhao et al. | |
| 2004/0033732 | A1 | | 2/2004 | Koch, Jr. | |
| 2006/0217005 | A1 | | 9/2006 | Langhoff | |
| 2006/0264122 | A1 | * | 11/2006 | Aman | A61N 1/3752 439/843 |
| 2010/0003866 | A1 | | 1/2010 | Dent et al. | |
| 2010/0029143 | A1 | | 2/2010 | Cossette | |
| 2010/0068941 | A1 | | 3/2010 | Yang et al. | |
| 2014/0120760 | A1 | | 5/2014 | Zieman et al. | |
| 2015/0244096 | A1 | | 8/2015 | Uppleger et al. | |
| 2018/0342824 | A1 | | 11/2018 | Ho | |

FOREIGN PATENT DOCUMENTS

| | | | |
|---|---|---|---|
| CN | 106532315 | A | 3/2017 |
| DE | 202016002912 | U1 | 6/2016 |
| EP | 0716474 | A1 | 6/1996 |
| JP | 5415351 | U | 1/1979 |
| JP | 55178969 | U | 12/1980 |
| JP | 2008135275 | A | 6/2008 |

OTHER PUBLICATIONS

European Search Report; European Application No. 19777217.1; Date: Nov. 19, 2021; 9 pages.
Indian Office Action; Indian Application No. 202017045073; Date: Sep. 26, 2022; 6 pages.
Japanese Office Action for Japanese Application No. 2020-552854; Report Mail Date Feb. 20, 2023 (pp. 1-9) with Translation.
Saudi Arabian Office Action for Saudi Arabian Application No. 520420240; Report Mail Date Dec. 23, 2022 (pp. 1-6).
Singapore Written Opinion; Singapore Application No. 11202009672X; Date: Mar. 18, 2022; 8 pages.
Israel Office Action for Israel Application No. 277660; Report Mail Date Dec. 7, 2023 (4 Pages).
Korean Office Action for Korean Application No. 10-2020-7031109; Report Mail Date Nov. 29, 2023 (9 Pages; with translation).
Korean Office Action issued in Korean Application No. 10-2024-7021730 dated Jul. 22, 2024; 9 pages (with English Translation.

* cited by examiner

ELECTRICAL SOCKET WITH CONTOURED CONTACT BEAMS

RELATED APPLICATIONS

This is a continuation of application Ser. No. 17/901,503 filed Sep. 1, 2022, which is a continuation of application Ser. No. 17/170,348, filed Feb. 8, 2021, (now U.S. Pat. No. 11,444,402), which is a continuation of application Ser. No. 16/595,938, filed Oct. 8, 2019, (now U.S. Pat. No. 10,950, 964), which is a continuation of application Ser. No. 15/940, 221 (now U.S. Pat. No. 10,541,489), filed on Mar. 29, 2018, the entire disclosure of each of which is incorporated herein by reference.

BACKGROUND

Conventional electrical sockets, such as barrel terminals, are configured to accept an electrical pin or prong. Known electrical sockets are disclosed in commonly assigned U.S. Pat. Nos. 6,899,571, 6,837,756, 4,734,063, and 4,657,335, the subject matter of each of which is incorporated by reference. The designs of such conventional electrical sockets can, however, lead to reduced performance and service life of the socket, namely due to deformation of the socket contacts, misalignment of the mating pin when inserted into the socket, and skiving of the mating pin.

Therefore, a need exists for an improved electrical socket that is designed to address the above problems and maintain high performance of the socket.

SUMMARY

Accordingly, the present disclosure may provide an electrical socket that comprises a cylindrical body defining a longitudinal axis and having opposite first and second end rings, a plurality of spaced contact beams extending between the first and second end rings, and an inner receiving area for accepting a mating pin. The first and second end rings are rotatably offset from one another with respect to the longitudinal axis, thereby twisting the contact beams into a hyperbolic geometry. Each of the contact beams may comprise a middle section between first and second end sections. The first and second end sections are attached to the first and second end rings, respectively, and the middle section of each contact beam may be longer and wider than each of the first and second end sections, such that each contact beam has a generally teardrop shape. The middle section of each contact beam has a contour that defines an inner contact area such that the middle section extends further into the inner receiving area than the first and second end sections and such that the inner contact areas are positioned for contact with the mating pin when inserted into the inner receiving area.

In certain examples, the contour of the middle section of each contact beam comprises a substantially concave form extending into the inner receiving area; the contour of the middle section of each contact beam comprises angled radii forms extending across the middle section substantially parallel to the longitudinal axis; the end rings have substantially the same diameter and width; the width of each end ring is greater than the width of each middle section of the contact beams; the hyperbolic geometry has a twist of about 40 to 70 degrees; the cylindrical body is a one-piece unitary member; the contact beams are uniformly spaced; and/or the cylindrical body is made of copper, copper alloy, or silver plating.

The present disclosure may also provide a method of making an electrical socket, that comprises the steps of providing a conductive blank having opposite first and second connecting portions and a plurality of contact beams extending between the first and second connecting portions, each contact beam having a middle section between first and second end sections, the first and second end sections being attached to the first and second connecting portions, respectively; contouring each of the middle sections of the contact beams of the blank to define a contact area; after contouring, rolling the blank to form a cylindrical body wherein the first and second connecting portions form opposite first and second end rings of the body; and then twisting the first and second end rings in opposite directions with respect to a longitudinal axis of the body, thereby twisting the contact beams into a hyperbolic geometry and forming an inner receiving area of the body configured to accept a mating pin with the contact areas of the contact beams facing inside.

In accordance with some examples of the method, the step of contouring provides a substantially concave form in each middle section of each contact beam such that the middle sections extend into the inner receiving area after the step of twisting the first and second end rings; the step of contouring provides angled radii forms across each middle section of each contact beam; the step of twisting includes twisting the first and second end rings until the angled radii forms are substantially parallel to the longitudinal axis; the step of twisting the first and second end rings provides a twist between about 40 and 70 degrees with respect to the longitudinal axis; after the step of rolling the blank, attaching respective ends of the first and second connecting portions to form the first and second end rings, respectively; further comprising the step of welding or mechanically locking end edges of the blank after contouring and rolling the blank to form the cylindrical body; further comprising the step of stamping the blank from a sheet of conductive material; the sheet is made of copper, copper alloy, or silver plating; further comprising the step of forming the cylindrical body as a one-piece unitary member; and/or further comprising the step of uniformly spacing the contact beams.

The present disclosure may yet further provide an electrical socket that comprises a cylindrical body that defines a longitudinal axis and has opposite first and second end rings, a plurality of spaced contact beams extending between the first and second end rings, and an inner receiving area for accepting a mating pin, wherein the first and second end rings are rotatably offset from one another with respect to the longitudinal axis, thereby twisting the contact beams into a hyperbolic geometry. Each of the contact beams comprises a middle section between first and second end sections and the first and second end sections is attached to the first and second end rings. The middle section of each contact beam has a pre-formed contour that defines a fully radiused, inner contact area without sharp edges such that each middle section extends further into the inner receiving area than the first and second end sections and such that the fully radiused, inner contact areas are positioned for contact with the mating pin when inserted into the inner receiving area.

In an example, each pre-formed contour is configured to match the radius of the mating pin for the contact with the mating pin when inserted into the inner receiving area of the cylindrical body.

The present disclosure may yet still provide an electrical socket, comprising a cylindrical body that defines a longitudinal axis and having opposite first and second end rings, a plurality of spaced contact beams extend between the first and second end rings, and an inner receiving area for accepting a mating pin, wherein the first and second end rings are rotatably offset from one another with respect to the longitudinal axis, thereby twisting the contact beams into a hyperbolic geometry. Each of the contact beams comprises a middle section between first and second end sections and the first and second end sections are attached to the first and second end rings, respectively. The middle section of each contact beam is longer and wider than each of the first and second end sections. The middle section of each contact beam has a contour that defines a fully radiused, inner contact area without sharp edges such that each middle section has a generally C-shaped cross-section and extends further into the inner receiving area than the first and second end sections and each contour of each contact beam is configured to match the radius of the mating pin such that the fully radiused, inner contact areas are positioned for contact with the mating pin when inserted into the inner receiving area.

The present disclosure may further provide a method of making an electrical socket, comprising the steps of contouring contact beams of a conductive blank that has opposite first and second connecting portions and the contact beams extend between the first and second connecting portions, each contact beam has a middle section between first and second end sections, the first and second end sections is attached to the first and second connecting portions, respectively, the step of contouring the contact beams includes contouring each of the middle sections of the contact beams of the blank to have a inner contact area; after the step of contouring the middle sections of the contact beams, rolling the blank to form a cylindrical body wherein the first and second connecting portions form opposite first and second end rings of the body; and then twisting the first and second end rings in opposite directions with respect to a longitudinal axis of the body, thereby twisting the contact beams into a hyperbolic geometry and forming an inner receiving area of the body configured to accept a mating pin with the inner contact areas of the contact beams facing inside.

The present disclosure may relate to an electrical socket that has a socket body defining a longitudinal axis and having opposite first and second ends, a plurality of spaced contact beams extending between the first and second ends, and an inner receiving area for accepting a mating pin. The contact beams are configured for aligning into a hyperbolic geometry Each of the contact beams comprises a middle section between first and second end sections. The first and second end sections are attached to the first and second ends, respectively. The middle section of each contact beam has a pre-formed contour that defines a cross-section of each contact beam that defines a fully radiused, inner contact area without sharp edges such that each middle section extends further into the inner receiving area than the first and second end sections when the contact beams are aligned into the hyperbolic geometry and such that the fully radiused, inner contact areas of the contact beams are positioned for contact with the mating pin when inserted into the inner receiving area of the socket body.

In certain examples of the present disclosure, the contact beams are configured for aligning into the hyperbolic geometry by twisting the contact beams; the pre-formed contour of each contact beam is a pre-twist, pre-formed contour; and/or each pre-formed contour is configured to match a radius of the mating pin for the contact with the mating pin when the mating pin is inserted into the inner receiving area of the socket body.

In other examples, the socket body is substantially cylindrical; each of the first and second ends of the socket body is an end ring; the end rings have substantially the same diameter; the middle section of each contact beam is longer and wider than each of the first and second end sections; each contact beam has a teardrop shape; the socket body is a one-piece unitary member; and/or the contact beams are uniformly spaced.

The present disclosure may further relate to an electrical socket that comprises a socket body defining a longitudinal axis and having opposite first and second end rings, a plurality of spaced contact beams extending between the first and second end rings, and an inner receiving area for accepting a mating pin. The first and second end rings can be positioned with respect to the longitudinal axis for aligning the contact beams into a hyperbolic geometry. Each of the contact beams comprises a middle section between first and second end sections. The first and second end sections are attached to the first and second end rings, respectively. The middle section of each contact beam is longer and wider than each of the first and second end sections. The middle section of each contact beam has a pre-formed longitudinal contour prior to aligning the contact beams into the hyperbolic geometry. The pre-formed longitudinal contour defines a fully radiused, inner contact area without sharp edges such that each middle section of each contact beam has a generally C-shaped cross-section and extends further into the inner receiving area than the first and second end sections. Each pre-formed longitudinal contour of each contact beam is configured to match the radius of the mating pin such that the fully radiused, inner contact areas of the contact beams are positioned for contact with the mating pin when the mating pin is inserted into the inner receiving area of the socket body.

In some examples, the contact beams are configured for aligning into the hyperbolic geometry by twisting the contact beams and the pre-formed contour of each contact beam is a pre-twist, pre-formed contour; the first and second end rings of the socket body are rotatably offset from one another with respect to the longitudinal axis of the socket body; each contact beam has a teardrop shape; the socket body is substantially cylindrical; and/or the socket body is a one-piece unitary member.

The present disclosure may yet further relate to a method of making an electrical socket that comprises the steps of contouring contact beams of a conductive blank that has opposite first and second connecting portions and the contact beams extend between the first and second connecting portions, each contact beam has a middle section between first and second end sections and the first and second end sections are attached to the first and second connecting portions, respectively, wherein contouring the contact beams includes contouring each of the middle sections of the contact beams of the conductive blank to have an inner contact area; and after the step of contouring the middle sections of the contact beams, forming a socket body wherein the first and second connecting portions form opposite first and second ends of the socket body with the contact beams extending therebetween, thereby forming an inner receiving area of the socket body configured to accept a mating pin with the inner contact areas of the contact beams facing inside.

In certain examples of the method, the step of forming the inner receiving area of the socket body includes aligning the contact beams into a hyperbolic geometry; the step of aligning the contact beams into the hyperbolic geometry includes twisting the contact beams; the step of forming the socket body includes rolling the conductive blank to form a substantially cylindrical body; the step of contouring provides a substantially concave form in each middle section of each contact beam such that the middle sections extend into the inner receiving area of the socket body after the step of twisting the first and second end rings; and/or the method further comprises the step of forming the socket body as a one-piece unitary member.

This summary is not intended to identify essential features of the claimed subject matter, nor is it intended for use in determining the scope of the claimed subject matter. It is to be understood that both the foregoing general description and the following detailed description are exemplary and are intended to provide an overview or framework to understand the nature and character of the disclosure.

BRIEF DESCRIPTION OF THE DRAWINGS

The accompanying drawings are incorporated in and constitute a part of this specification. It is to be understood that the drawings illustrate only some examples of the disclosure and other examples or combinations of various examples that are not specifically illustrated in the figures may still fall within the scope of this disclosure. Examples will now be described with additional detail through the use of the drawings, in which.

DETAILED DESCRIPTION

Figure 1:
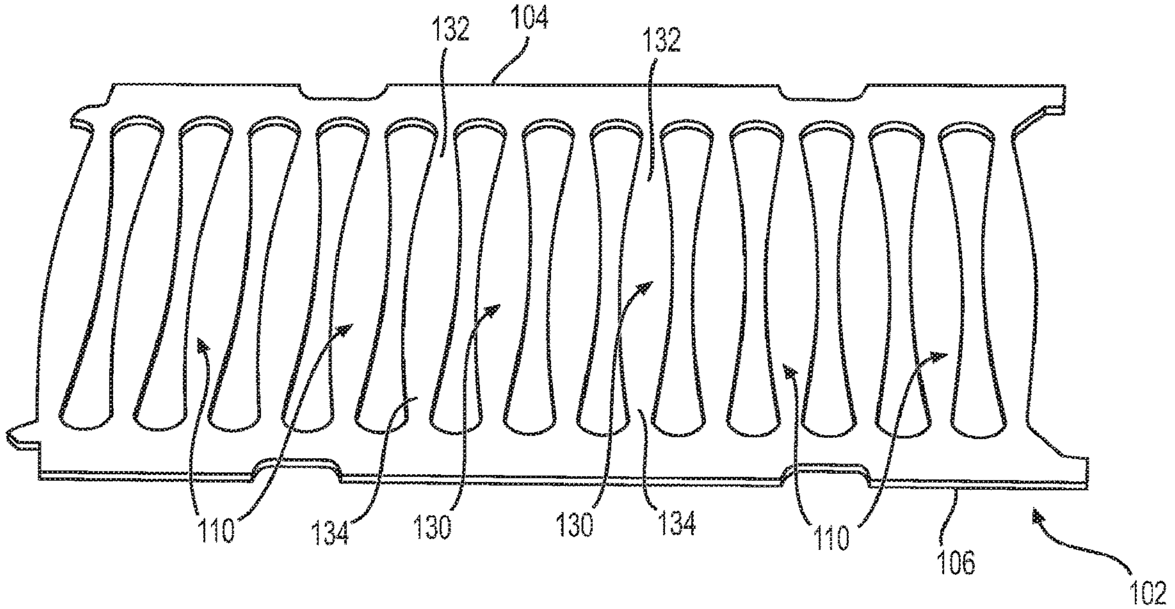
FIG. 1 is a perspective view of a blank of an electrical socket according to an exemplary example of the present disclosure.

Referring to the figures, the present disclosure relates to an electrical socket, such as for high current applications, with improved durability and performance. In an example, the present disclosure relates to an electrical socket 100 that is configured to be radially resilient for accepting a mating pin or prong 10. In a preferred example, the electrical socket 100 is adapted for high current applications. In general, the electrical socket 100 may be a stamped and formed electrical contact grid or blank 102 that is rolled and then twisted into a hyperbolic geometry inside of which the mating pin 10 is received. Contact beams 110 of the electrical socket 100 may be particularly shaped and contoured to aid in mating pin contact with the inner contact surface area of the electrical socket 100 and increase the contact cycle life of the mating pin 10.

The design of electrical socket 100 of the present disclosure is configured to provide high radial resilience which allows, among other things, misalignment between the pin 10 and the electrical socket 100 at the connection interface; contact pressure (i.e. normal force) between the pin 10 and the electrical socket 100 that is delivered by both normal beam deflection forces as well as tensile forces of contact beams; low electrical resistance due to a relatively high amount of contact interface area between the hyperbolically formed contact beams 110 wrapping around the mating pin 10; low mating forces due to the distribution of the normal contact forces over a large surface area; tolerance of damage to one or more of the contact beams 110 by debris or foreign material; and/or the capability of a high number of mating cycles due to the distribution of plating wear (friction) over large surface.

Figure 2:
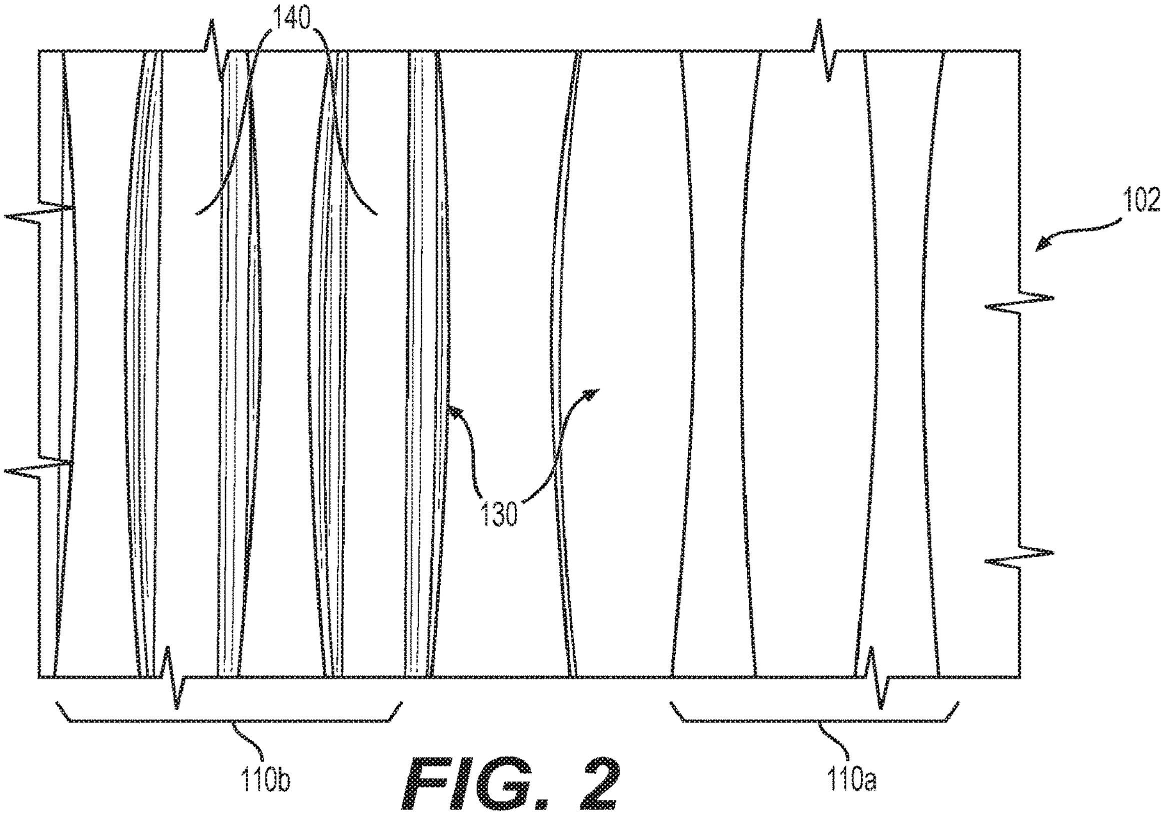
FIG. 2 is an enlarged plan view of a portion of the blank illustrated in FIG. 1.
Figure 3B:
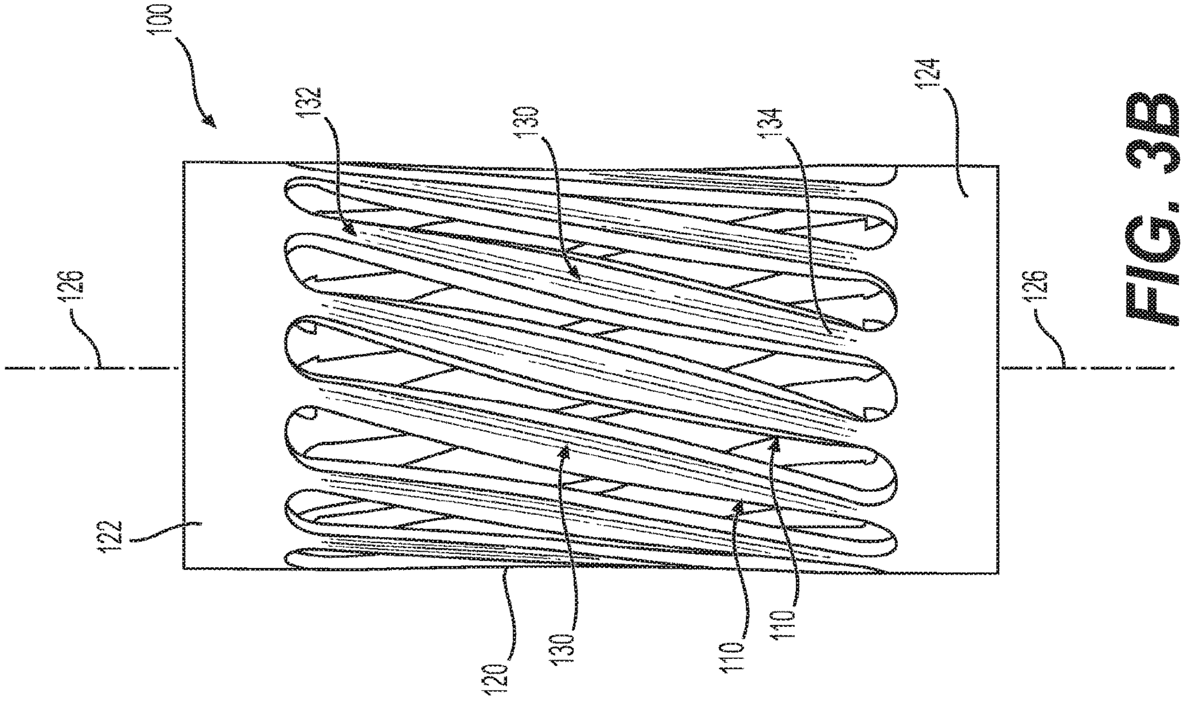
FIGS. 3A and 3B are perspective and elevational views, respectively, of an electrical socket according to an exemplary example of the present disclosure, after the blank of the electrical socket has been rolled and twisted.
Figure 3A:
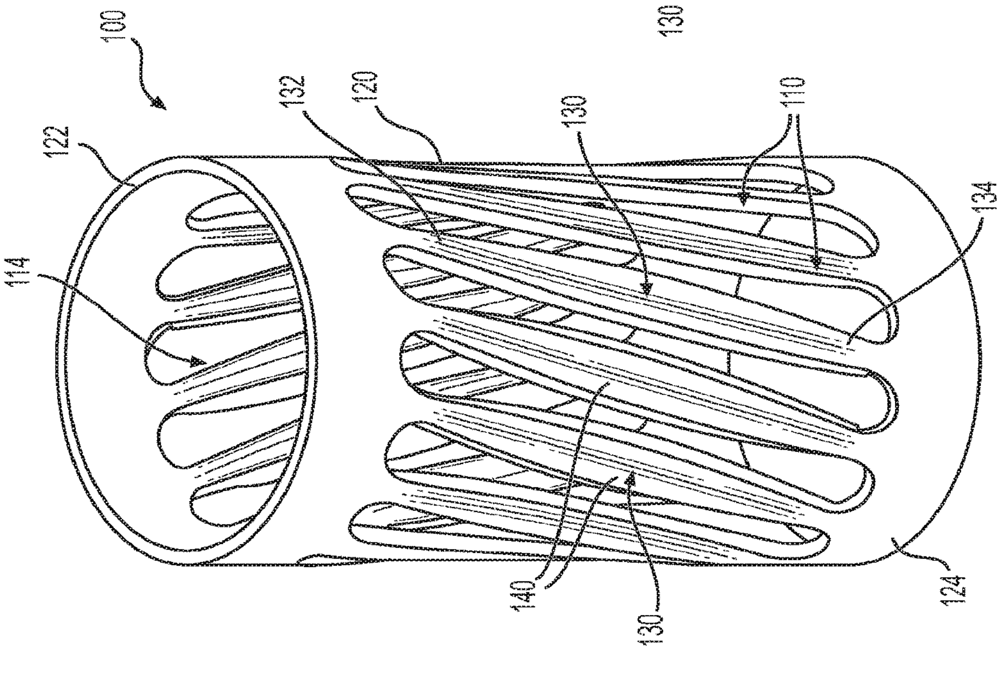

FIGS. 1 and 2 illustrate the blank 102 of the electrical socket 100 prior to rolling and twisting the same into the hyperbolic geometry (seen in FIGS. 3A and 3B). Blank 102 is a grid comprising connecting portion 104 and 106 with the contact beams 110 extending therebetween. Blank 102 may be stamped from a sheet of conductive material, such as copper or copper alloy, or metal plating, such as gold, silver, or nickel plating and the like. FIG. 1 shows the contact beams 110*a* before being formed or contoured. FIG. 2 shows some of the contact beams 110*b* after the contact beams 110 have been contoured, in accordance with the present disclosure.

As seen in FIGS. 3A and 3B, once the blank 102 is rolled and twisted, the electrical socket 100 generally comprises a cylindrical body 120 with one or more of the contoured contact beams 110 extending between opposite end rings 122 and 124. End rings 122 and 124 are preferably rotatably offset from one another with respect to a longitudinal axis 126 (FIG. 3B) defined by cylindrical body 120, thereby twisting contact beams 110 into a hyperbolic geometry, inside of which defines an inner receiving area 114 for accepting the mating pin 10. The end rings 122 and 124 may have substantially the same diameter and width. The width of each end ring 122 and 124 is preferably selected to provide an increased strength to the cylindrical body 120 and/or to provide a press-fit engagement with either a bore of a connector or outer housing sleeve.

Each contact beam 110 comprises a middle section 130 that is between two end sections 132 and 134. End sections 132 and 134 are connected or attached to end rings 122 and 124, respectively. Each middle section 130 of each contact beam 110 is preferably longer and wider than each end section 132 and 134, such that each contact beam 110 has a generally teardrop shape, as seen in FIG. 1. This generally teardrop shape provides more mass in the center of the electrical socket 100.

Figure 4:
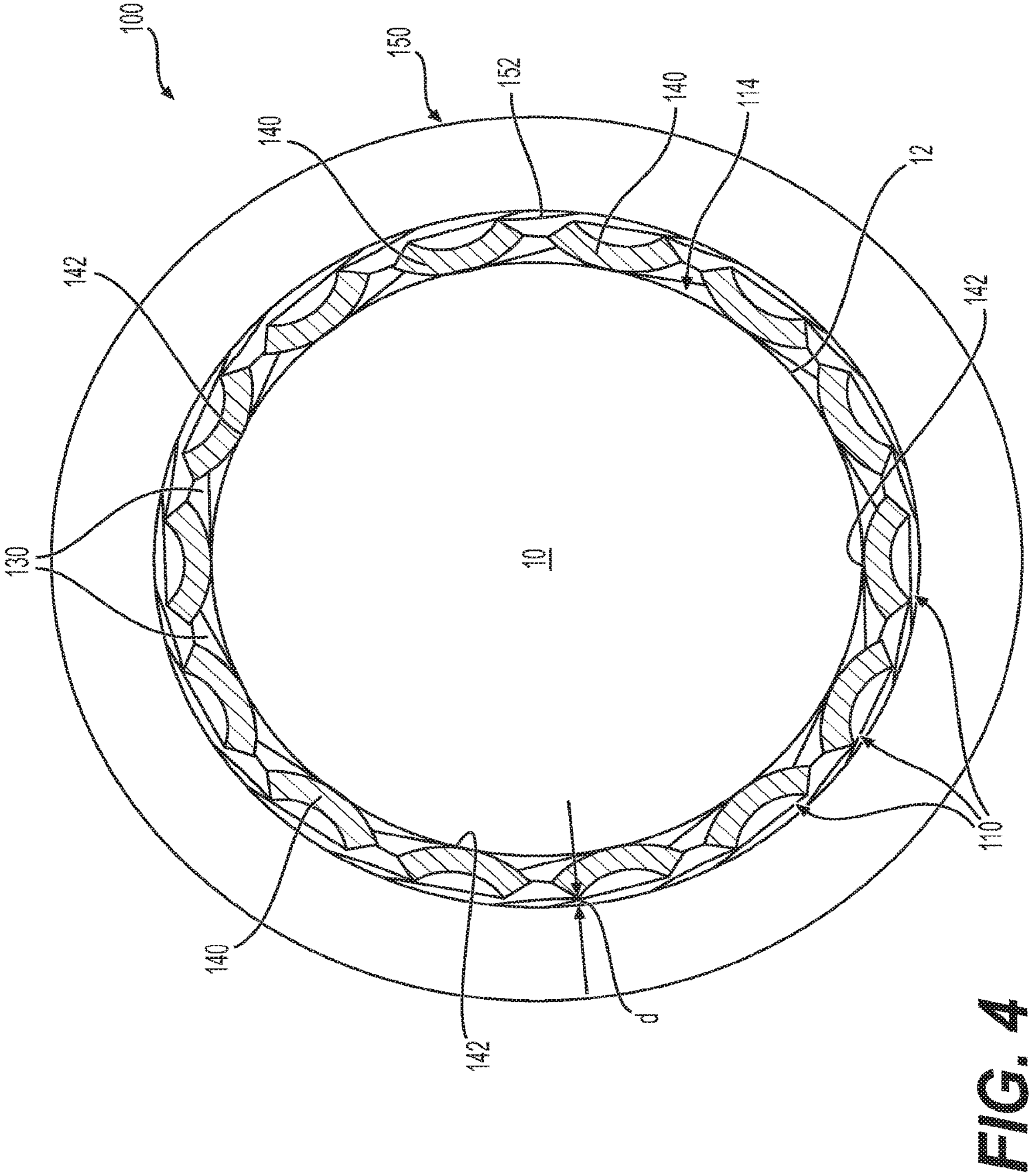
FIG. 4 is an enlarged cross-sectional view of the electrical socket illustrated in FIGS. 3A and 3B, showing a mating pin received in the electrical socket.

The middle sections 130 of each contact beam 110 may have a contour 140 that defines an inner contact area 142 for engaging the mating pin 10. The inner contact areas 142 preferably extend into inner receiving area 114 of the electrical socket 100. As such, the middle sections 130 extend further or deeper into inner receiving area 114 than end sections 132 and 134 so that the inner contact areas 142 are positioned for smooth and resilient contact with the mating pin 10 when it is inserted into inner receiving area 114. In a preferred example, the middle sections 130 are contoured so that the contour 140 is a substantially concave form that curves into inner receiving area 114 such that the cross-section of each middle section 130 is generally curved and not straight rectangular, and preferably generally C-shaped, as best seen in FIG. 4. The contoured teardrop or ellipsoid shape of the contact beams 110 adds bending resistance thereto and a fully radiused, smooth contact area at the pin-to-socket interface. As seen in FIG. 4, when the mating pin 10 is received in the inner receiving area 114 of the electrical socket 100, its outer contact surface 12 engages the smooth inner contact areas 142 of the middle sections 130 of the contoured contact beams 110 without sharp edges ever contacting the pin's outer surface 12.

The shape and contour 140 of the contact beams 110 achieves several performance benefits to the electrical socket such as, an increase in the beam bending strength of each contact beam 110 due to its three dimensional contoured form; enabling delivery of higher normal contact forces between the mating pin 10 and the electrical socket 100; a wider radial depth of an arched profile of contact beams 110, thereby serving to limit the maximum radial offset possible to eliminate the risk of mechanical overstressing and plastic deformation of contact beams 110, particularly in a misaligned condition between the mating pin 10 and the electrical socket 100; and/or an arched profile of contact beams 110 which serves to eliminate sharp edges from the pin-to-socket interface area, thereby eliminating the possibility of skiving plating off the mating pin 10 and extending the mating service life of the interface connection.

In one example, the electrical socket 100 is preferably one-piece. Also, the contact beams 110 may be uniformly spaced around the cylindrical body 120. However, the electrical socket 100 may be formed as more than one-piece and the contact beams 110 may be spaced non-uniformly. Also, although the end rings 122 and 124 preferably have substantially the same diameter and width; end rings 122 and 124 may have different diameters and widths. In another example, the end rings 122 and 124 have an increased width to increase the strength of the electrical socket 100 and protect the electrical socket 100 from being over stressed. For example, the width of each end ring 122 and 124 may be greater that the width of each middle section 130 of the contact beams 100.

The design of the electrical socket 100 of the present disclosure provides sufficient mechanical structure such that the socket 100 may be used as a standalone socket, that is without an outer housing. Due to the contoured contact beam profiles of the socket 100, the socket 100 may be simply press-fit into a bore, such as zero clearance bore, such as in a contact holder body of a cable connector. As an option, however, the electrical socket 100 may be inserted into a holder sleeve 150, as seen in FIG. 4. The holder sleeve 150 may receive the electrical socket 100, in a press-fit, for example. In either case, the design and contour 140 of the contact beams 110 help prevent overstressing and plastic deformation of the contact beams 110, particularly if there is misalignment between the mating pin 10 and the electrical socket 100. That is because the contour of the contact beams 110 creates minimal space between the contact beams 110 and inner surface of the bore or the holder sleeve 150, such that the contact beams 110 would travel only a minimal distance d (FIG. 4) before they hit the inner surface 152 of the bore or the holder sleeve 150.

A method for making the electrical socket 100, according to an example of the present disclosure, may comprise the steps of stamping a conductive sheet to form the blank 102 with the connecting portions 104 and 106 and the substantially teardrop shaped contact beams 110 therebetween, as seen in FIG. 1. The size of the blank 102 may be selected based on the application, e.g. the diameter of the mating pin (such as 8 mm or 12 mm diameter pin). After forming the blank 102, each of the middle sections 130 of the contact beams 110 is contoured, as described above. That is, each middle section 130 is shaped and contoured to have contour 140. After contouring the contact beams 110, the blank 102 may be rolled to form the cylindrical body 120 and the connecting portions 104 and 106 will form the opposite end rings 122 and 124, respectively, of the body 120. The end edges of the rolled blank may be attached to one another by welding, mechanically such as by interlocking protrusions, or the like. Alternatively, the end edges of the rolled blank may not be attached and left un-joined.

Once rolled into the cylindrical body 120, the end rings 122 and 124 are rotated with respect to the longitudinal axis 126 of the body 120 in opposite directions, thereby twisting the contact beams 110 into the hyperbolic geometry and forming the inner receiving area 114 of the body 120 configured to accept the mating pin 10 with the contact areas 142 of the contact beams 110 facing inside. The amount or degree of twist may be customized, that is, it may be any degree or range of degrees based on a particular application (e.g. the diameter of mating pin 10). Factors that determine the amount of twist include, but are not limited to, having enough twist to pull the contoured contact beams 110 inwardly enough so that they do not interfere with the connector bore or housing the electrical socket 100 is going inserted into; having enough twist to ensure no sharp edges can contact the mating pin 10 when inserted into the inner receiving area 114 of the socket 100; and having sufficient pin engaging forces between the contact beams 110 and the mating pin 10, particularly in view of the size of the mating pin. In one example, the degree of twist may be about 40 to 70 degrees. In a preferred example, the degree of twist may be about a 58 degree twist for a 12 mm sized mating pin 10.

In one example, after the cylindrical body 120 is twisted into the hyperbolic geometry, the electrical socket 100 may be inserted into the housing sleeve 150. The electrical socket 100 may be press-fit or welded, for example, into the housing sleeve 150. Alternatively, the leading edge of a holder sleeve 150 may be formed after the electrical socket 100 is inserted therein to trap it inside the holder sleeve 150.

FIGS. 5A through 7 illustrate an alternative example of the electrical socket 100' according to the present disclosure. The electrical socket 100' of this example is similar to the electrical socket 100 of the first example, except that the contour 140' of the middle sections 130' of the contact beams 110' comprises angle radii forms **140*a*' and 140*b*' (FIGS. 5B, 6A, and 6B) that extend across the width of the middle sections 130' and define a formed radius contact area 142' therebetween that corresponds to the size of the mating pin 10**.

Like the first example, the electrical socket 100' generally includes a cylindrical body 120' with opposing end rings 122' and 124' and teardrop shaped contact beams 110' therebetween. The electrical socket 100' is made in the same manner and steps as described above regarding the electrical socket 100 of the first example, except that a different contour 140' is applied to the contact beams 110'.

Figure 5A:
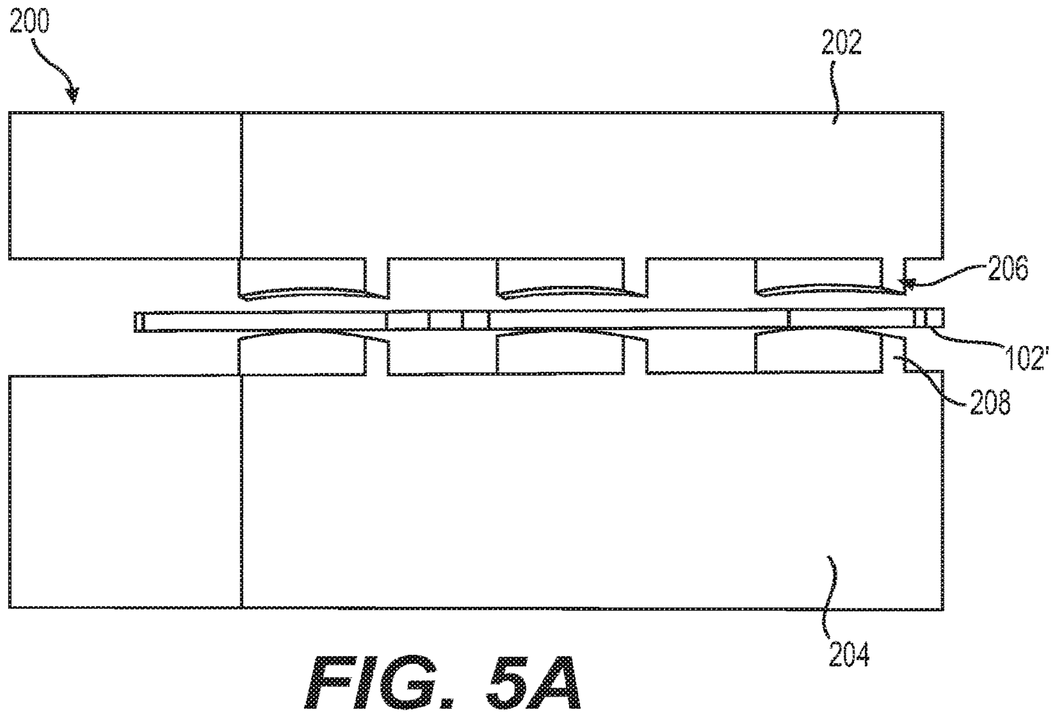
FIGS. 5A and 5B are partial plan and perspective views of tooling used to make an electrical socket according to an exemplary example of the present disclosure.
Figure 5B:
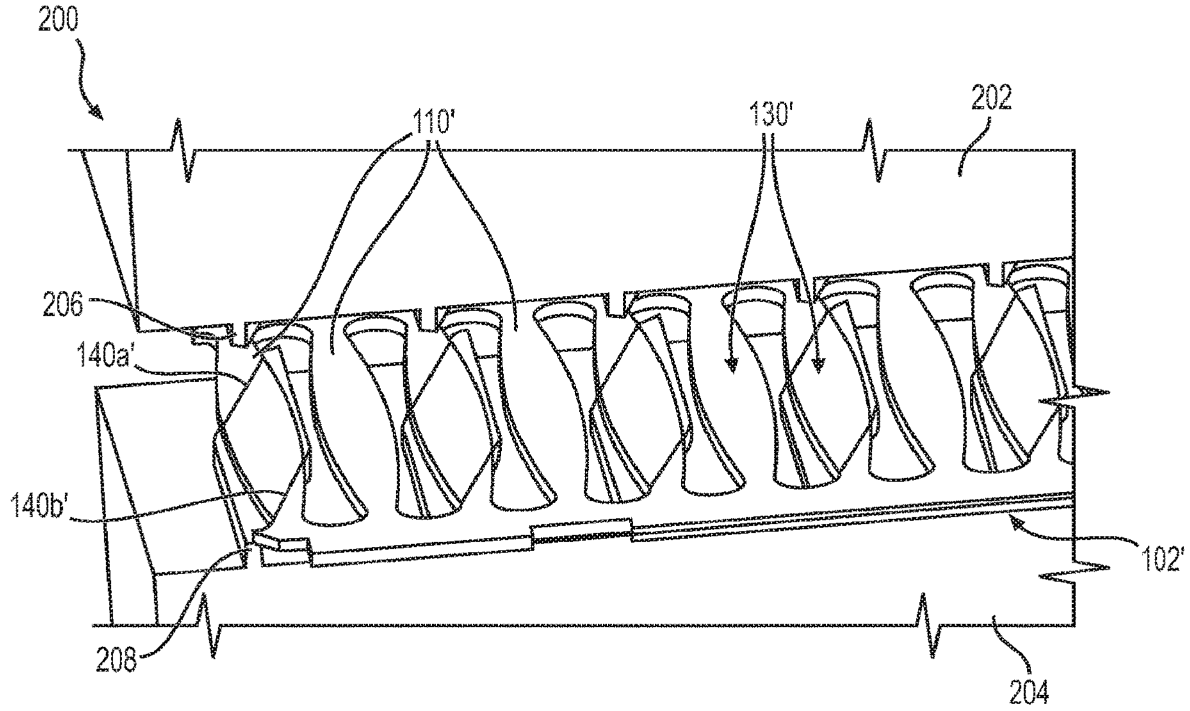
Figure 6B:
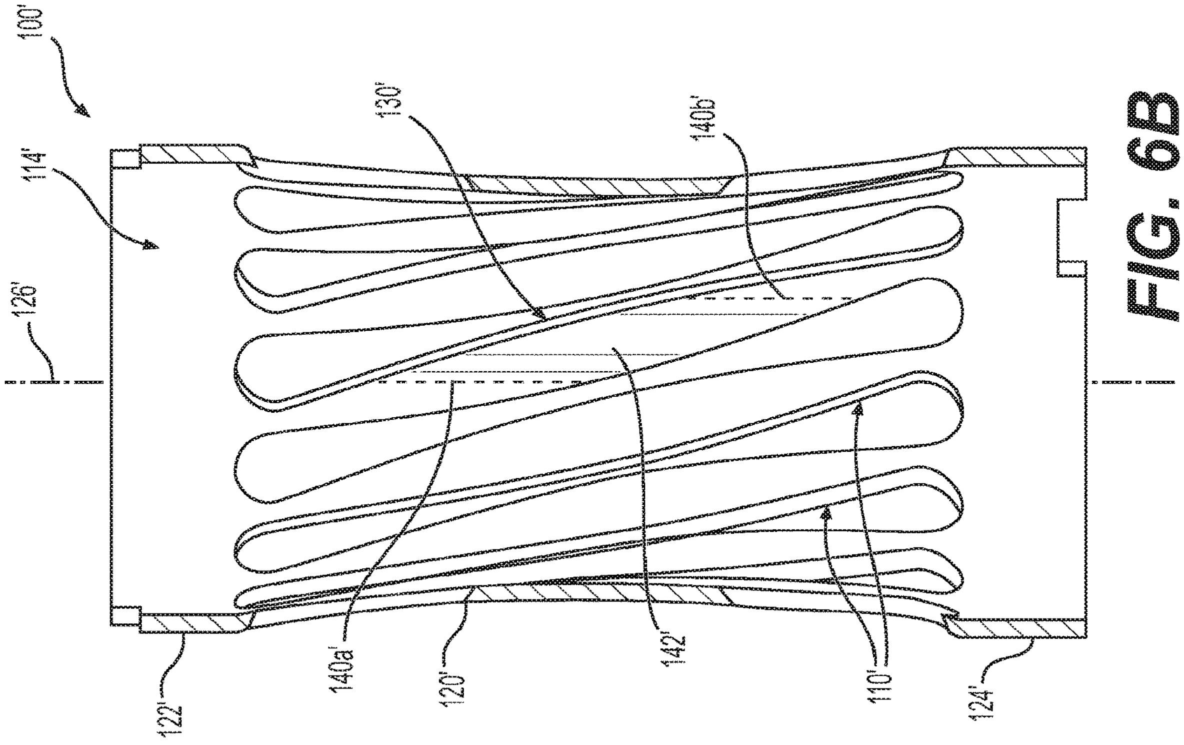
FIGS. 6A and 6B are cross-sectional views of an electrical socket according to an exemplary example of the present disclosure, after the blank of the electrical socket is rolled (FIG. 6A) and twisted (FIG. 6B)
Figure 6A:
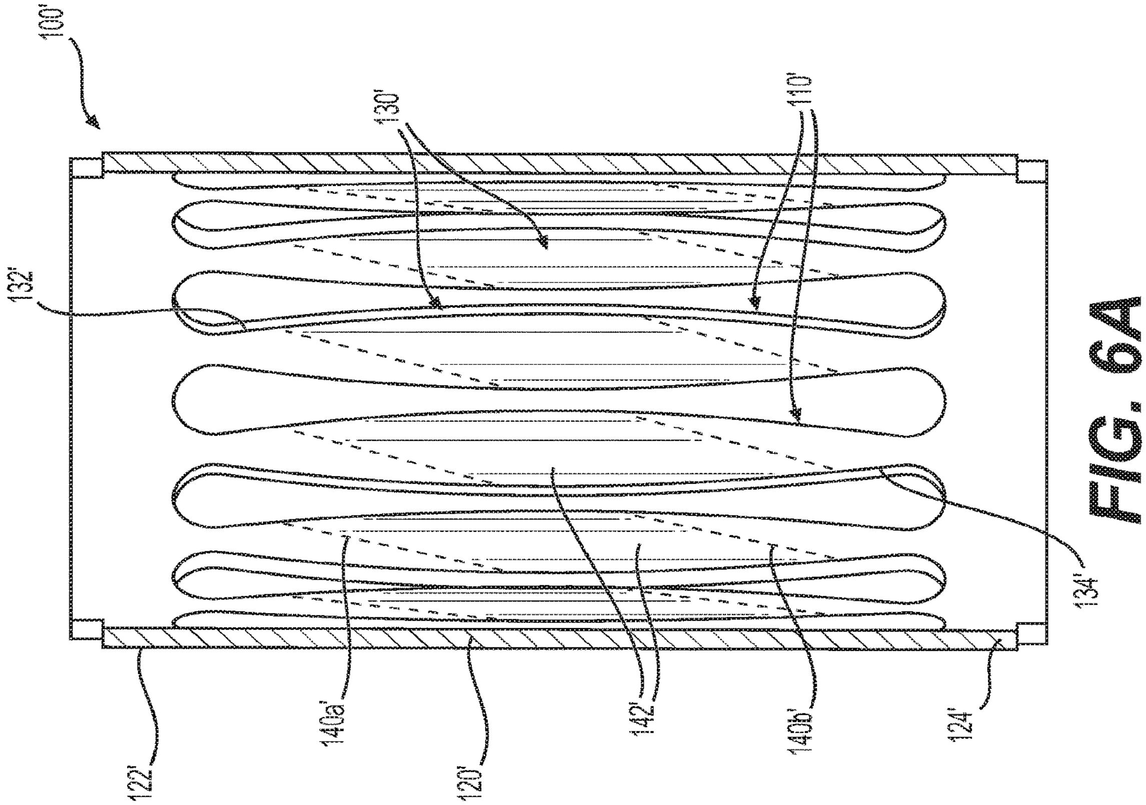

FIGS. 5A and 5B illustrate a tool 200 for forming the contour 140', which comprises the angled radii forms **140*a*' and 140*b*' and the formed radius contact area 142', in the contact beams 110'. The tool 200 has upper and lower parts 202 and 204 with the blank 102' of the electrical socket 100' sandwiched therebetween. Blank 102' and blank 102 of the first example may be substantially the same. Angled and curved inward extensions 206 and 208 of each tool upper and lower parts 202 and 204, respectively, are positioned to form the contact area 142' between the angled radii forms 140*a*' and 140*b*' in each middle section 130' of each contact beam 110'. Each middle section 130' is between end sections 132' and 134' of the contact beam 110'. The angled radii forms 140***a*' and 140*b*' preferably correspond to the radius of the mating pin 10, such that the angled radii forms 140*a*' and 140*b*' define tangent points of where the mating pin radius 10 feathers out and the contact area 142' therebetween is the radius of the mating pin 10. The placement and angle of the angled radii forms 140*a*' and 140*b*' and contact area 142' with respect to the length of the contact beams 110' is selected such that when the cylindrical body 120' is twisted (at end rings 122' and 124') to form the hyperbolic geometry, the angled radii forms 140*a*' and 140*b*' are oriented substantially parallel to the longitudinal axis 126' of the cylindrical body 120', as seen in FIG. 6B. The placement and angle of the angled radii forms 140*a*' and 140*b*' may be customized depending on the application, such as the diameter of the mating pin 10.

Figure 7:
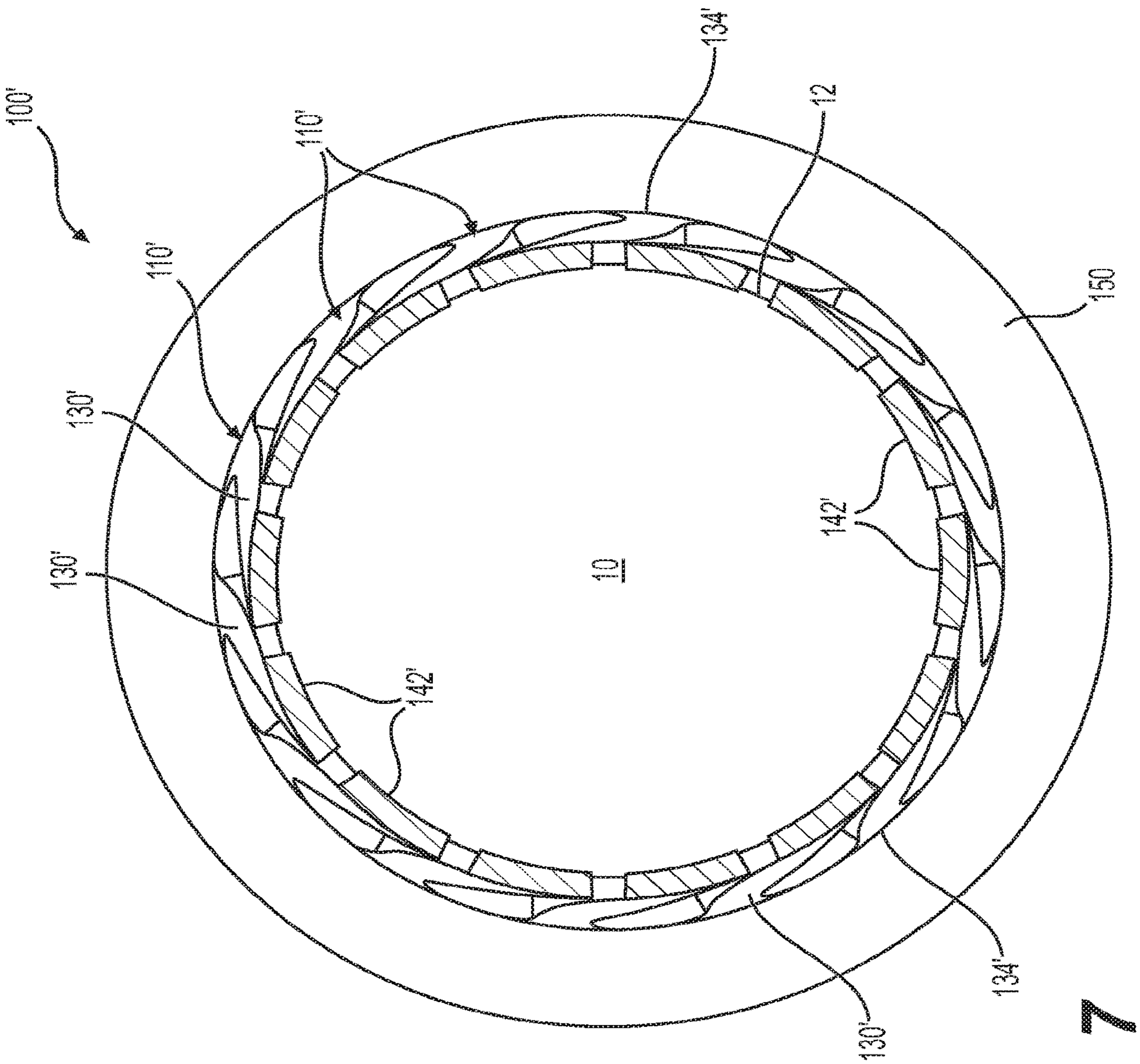
FIG. 7 is an enlarged cross-sectional view of the electrical socket illustrated in FIGS. 6A and 6B, showing a mating pin received in the electrical socket.

As seen in FIG. 7, when the mating pin 10 is received in the electrical socket 100', the contact areas 142' of each contact beam 110' extend into the inner receiving area 114' (FIG. 6A) of the socket 100' and engage the outer surface 12 of the mating pin 10. Because the angled radii forms 140*a*' and 140*b*' are generally parallel to the longitudinal axis 126' (after twisting) and each formed contact area 142' therebetween corresponds to the size of the selected mating pin 10, smooth contact with the mating pin 10 when it is inserted into the socket's inner receiving area 114' is achieved.

It will be apparent to those skilled in the art having the benefit of the teachings presented in the foregoing descriptions and the associated drawings that modifications, combinations, sub-combinations, and variations can be made without departing from the spirit or scope of this disclosure. Likewise, the various examples described may be used individually or in combination with other examples. Those skilled in the art will appreciate various combinations of examples not specifically described or illustrated herein that are still within the scope of this disclosure. In this respect, it is to be understood that the disclosure is not limited to the specific examples set forth and the examples of the disclosure are intended to be illustrative, not limiting.

As used in this specification and the appended claims, the singular forms "a", "an" and "the" include plural referents, unless the context clearly dictates otherwise. Similarly, the adjective "another," when used to introduce an element, is intended to mean one or more elements. The terms "comprising," "including," "having" and similar terms are intended to be inclusive such that there may be additional elements other than the listed elements.

Additionally, where a method described above or a method claim below does not explicitly require an order to be followed by its steps or an order is otherwise not required based on the description or claim language, it is not intended that any particular order be inferred. Likewise, where a method claim below does not explicitly recite a step mentioned in the description above, it should not be assumed that the step is required by the claim.

It is noted that the description and claims may use geometric or relational terms, such as such as above, below, upper, lower, top, bottom, linear, cylindrical, arcuate, elongated, parallel, perpendicular, etc. These terms are not intended to limit the disclosure and, in general, are used for convenience to facilitate the description based on the examples shown in the figures. In addition, the geometric or relational terms may not be exact. For instance, walls may not be exactly perpendicular or parallel to one another because of, for example, roughness of surfaces, tolerances allowed in manufacturing, etc., but may still be considered to be perpendicular or parallel.

What is claimed is:

1. An electrical socket comprising:

a socket body having a first end ring, a second end ring, a plurality of spaced contact beams extending between said first and second end rings, each of said plurality of contact beams having a first end section coupled to said first end ring, a second end section coupled to said second end ring and a middle section positioned between said first end section and said second end section, wherein each of said plurality of contact beams has a contour extending continuously between said first end section and said second end section such that a cross-section of said middle section of said plurality of contact beams taken in a plane oriented perpendicular to a longitudinal axis of said socket body is generally C-shaped and extends toward an interior of said socket body, said middle section having an inner contact area for contacting a mating pin receivable within said socket body.

2. The electrical socket of claim 1, wherein a diameter of said socket body at said middle section of said plurality of spaced contact beams is less than a diameter of the socket body at at least one of said first end ring and said second end ring.

3. The electrical socket of claim 1, wherein only said inner contact area of said at least one of said plurality of contact beams is configured to contact said mating pin receivable within said socket body.

4. The electrical socket of claim 1, wherein said middle section of said at least one of said plurality of contact beams is longer and wider than each of said first end section and said second end section.

5. The electrical socket of claim 4, wherein said at least one of said plurality of contact beams has a teardrop shape.

6. The electrical socket of claim 1, wherein said socket body has a hyperbolic geometry.

7. The electrical socket of claim 6, wherein said first end ring rotatably offset from said second end ring about said longitudinal axis of said socket body.

8. The electrical socket of claim 1, wherein said inner contact area of said at least one of said plurality of contact beams has a smooth surface.

9. The electrical socket of claim 1, wherein said socket body is formed as a single piece.

10. The electrical socket of claim 1, wherein said cross-section of said middle section of said at least one of said plurality of contact beams has a concave curvature.

11. The electrical socket of claim 1, wherein said cross-section of said at least one contact beam between said first end and said second end is C-shaped.

12. A method of making an electrical socket, comprising the steps of:

contouring a middle section of at least one contact beam of a conductive blank to have a non-planar inner contact area for contacting a mating pin receivable within the electrical socket; and rolling said conductive blank to form a cylindrical body after said contouring said middle section of said at least one contact beam, wherein said inner contact area extends inwardly towards an interior of said cylindrical body when viewed in a plane oriented perpendicular to a longitudinal axis of said cylindrical body.

13. The method of claim 12, further comprising twisting said at least one contact beam into a hyperbolic geometry.

14. The method of claim 13, wherein said twisting said at least one contact beam into said hyperbolic geometry further comprises twisting a first end of said cylindrical body relative to a second end of said cylindrical body about said longitudinal axis.

15. The method of claim 12, wherein contouring said middle section of said at least one contact beam of said conductive blank to have said inner contact area further comprises contouring said middle section of said at least one contact beam to have a concave form.

16. The method of claim 12, wherein contouring said middle section of said at least one contact beam of the conductive blank to have said inner contact area further comprises contouring said middle section of said at least one contact beam to have a C-shape.

17. The method of claim 12, further comprising stamping said conductive blank to form said at least one contact beam.

18. The method of claim 12, further comprising attaching opposite edges of said conductive blank together after said rolling said conductive blank to form the cylindrical body.

19. An electrical socket comprising:

a rolled body having a first end, a second end, and a plurality of connectors connected to and extending between said first end and said second end;

wherein at least one of said plurality of connectors has a longitudinally extending contour and a cross-section of said at least one of said plurality of connectors, taken in a plane oriented perpendicular to a longitudinal axis of the rolled body is directionally shaped toward an interior of said socket body and has an inwardly facing surface for contacting a mating pin receivable within said socket body.

20. The electrical socket of claim 19, wherein a diameter at said central portion of said plurality of connectors is less than a diameter at at least one of said first end and said second end of said plurality of connectors.

21. The electrical socket of claim 19, wherein only said inwardly facing surface of said at least one of said connectors is configured to contact said mating pin receivable within said socket body.

22. The electrical socket of claim 19, wherein each of said plurality of connectors has opposite ends connected to said first end and said second end, respectively, said central portion of said at least one of said plurality of connectors being longer and wider than said ends of said connector.

23. The electrical socket of claim 22, wherein said central portion of said at least one of said plurality of connectors has a teardrop shape.

24. The electrical socket of claim 19, wherein said at least one of said plurality of connectors has a hyperbolic geometry.

25. The electrical socket of claim 24, wherein said first end is rotatably offset from said second end about said longitudinal axis of said socket body.

26. The electrical socket of claim 19, wherein said central portion of said at least one of said plurality of connectors has a concave curvature.

27. The electrical socket of claim 19, wherein said cross-section of said central portion of said at least one of said plurality of connectors is C-shaped.

* * * * *